(12) United States Patent
Boot et al.

(10) Patent No.: US 9,394,770 B2
(45) Date of Patent: Jul. 19, 2016

(54) REMOTE POWER SOLUTION

(71) Applicant: GE Oil & Gas ESP, Inc., Oklahoma City, OK (US)

(72) Inventors: John Christopher Boot, Atlanta, GA (US); Thomas Giles Szudajski, Atlanta, GA (US); Benjamin Earl Ross, Waukesha, WI (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 435 days.

(21) Appl. No.: 13/754,358

(22) Filed: Jan. 30, 2013

(65) Prior Publication Data
US 2014/0209289 A1  Jul. 31, 2014

(51) Int. Cl.
| | |
|---|---|
| *H02P 11/00* | (2006.01) |
| *H02H 7/06* | (2006.01) |
| *H02P 9/00* | (2006.01) |
| *E21B 43/12* | (2006.01) |
| *H02J 4/00* | (2006.01) |
| *E21B 41/00* | (2006.01) |
| *F02D 29/06* | (2006.01) |
| *H02P 9/04* | (2006.01) |

(52) U.S. Cl.
CPC ........... *E21B 43/126* (2013.01); *E21B 41/0085* (2013.01); *E21B 43/128* (2013.01); *H02J 4/00* (2013.01); *Y10T 307/406* (2015.04)

(58) Field of Classification Search
USPC .......................... 322/32, 36; 290/40 C, 40 R
See application file for complete search history.

(56) References Cited

U.S. PATENT DOCUMENTS

| | | | | | |
|---|---|---|---|---|---|
| 3,703,663 | A | * | 11/1972 | Wagner | H02H 7/062 307/86 |
| 3,911,286 | A | * | 10/1975 | Uram | G06K 13/0825 290/40 R |
| 4,032,793 | A | * | 6/1977 | Uram | F01D 17/24 290/2 |
| 4,118,635 | A | * | 10/1978 | Barrett | F01D 17/24 290/40 R |
| 4,195,231 | A | * | 3/1980 | Reed | F01K 23/105 290/40 R |
| 4,262,209 | A | * | 4/1981 | Berner | F02D 29/06 174/DIG. 15 |
| 4,412,780 | A | * | 11/1983 | Collins | F01D 17/145 415/17 |
| 5,311,063 | A | * | 5/1994 | Hubler | F02D 31/006 123/320 |
| 5,636,507 | A | * | 6/1997 | Rajamani | F02C 9/28 60/39.27 |

(Continued)

OTHER PUBLICATIONS

International Search Report and Written Opinion issued in connection with corresponding PCT Application No. PCT/US2014/011039 on Nov. 5, 2014.

*Primary Examiner* — Pedro J Cuevas
(74) *Attorney, Agent, or Firm* — Crowe & Dunleavy, P.C.

(57) ABSTRACT

An independent power system provides electrical power to an electric submersible pumping system positioned in a well that produces petroleum products. The independent power system includes a generator and an engine connected to the generator. The engine is preferably provided with combustible gases from the petroleum products of the well. The independent power system further includes an integrated control system that is connected to the electric submersible pumping system and the generator. The independent power system is configured to balance the loads created by the electric submersible pumping system with the output from the electrical generator.

15 Claims, 3 Drawing Sheets

(56) References Cited

U.S. PATENT DOCUMENTS

| | | | |
|---|---|---|---|
| 5,731,688 A * | 3/1998 | Thomson | H02J 3/38 290/40 B |
| 5,734,255 A * | 3/1998 | Thompson | H02J 3/38 290/2 |
| 5,754,033 A * | 5/1998 | Thomson | H02J 3/38 307/57 |
| 5,973,481 A * | 10/1999 | Thompson | H02J 3/38 290/2 |
| 6,304,056 B1 * | 10/2001 | Gale | H02J 7/0029 320/104 |
| 6,420,793 B1 * | 7/2002 | Gale | F02N 11/04 123/179.28 |
| 6,580,178 B1 * | 6/2003 | Gale | H02J 7/1446 123/339.14 |
| 6,844,706 B2 * | 1/2005 | Pinkerton, III | H02J 7/1446 290/52 |
| 6,883,399 B2 * | 4/2005 | Burstall | B60K 6/105 74/573.1 |
| 7,024,859 B2 * | 4/2006 | Jayabalan | B60K 6/485 60/716 |
| 7,030,593 B2 * | 4/2006 | Pinkerton, III | H02J 7/1446 290/52 |
| 7,105,088 B2 * | 9/2006 | Schien | C10B 53/00 210/188 |
| 7,633,173 B2 * | 12/2009 | Keiter | F02D 29/06 290/40 A |
| 7,710,068 B2 * | 5/2010 | Tani | H02J 1/14 290/40 C |
| 8,169,092 B2 * | 5/2012 | Yamamura | F02B 63/04 290/2 |
| 8,222,756 B2 * | 7/2012 | Koeneman | F01P 3/00 290/1 A |
| 8,347,953 B1 | 1/2013 | Elizondo | |
| 8,350,412 B2 * | 1/2013 | Massie | H02J 3/00 307/65 |
| 8,392,030 B2 * | 3/2013 | Anderson | B60G 13/14 318/375 |
| 8,492,913 B2 * | 7/2013 | Koeneman | F01P 3/00 290/1 A |
| 8,820,286 B2 * | 9/2014 | Cole | H02K 1/2786 123/179.28 |
| 8,823,208 B2 * | 9/2014 | Bekiarov | H02P 9/48 307/10.1 |
| 8,829,698 B2 * | 9/2014 | Koeneman | F01P 3/00 290/1 A |
| 2003/0178972 A1 * | 9/2003 | Burstall | B60K 6/105 322/4 |
| 2004/0124813 A1 * | 7/2004 | Pinkerton, III | H02J 7/1446 322/32 |
| 2004/0188360 A1 | 9/2004 | Armstrong et al. | |
| 2004/0256109 A1 | 12/2004 | Johnson | |
| 2005/0122084 A1 * | 6/2005 | Pinkerton, III | H02J 7/1446 322/32 |
| 2005/0166594 A1 * | 8/2005 | Jayabalan | B60K 6/485 60/698 |
| 2007/0227470 A1 * | 10/2007 | Cole | H02K 11/048 123/3 |
| 2008/0077336 A1 * | 3/2008 | Fernandes | G01R 15/142 702/57 |
| 2008/0122408 A1 * | 5/2008 | Keiter | F02D 29/06 322/28 |
| 2008/0203734 A1 | 8/2008 | Grimes et al. | |
| 2008/0283247 A1 | 11/2008 | Zubrin et al. | |
| 2008/0309095 A1 * | 12/2008 | Keiter | F02D 29/06 290/40 R |
| 2009/0206599 A1 * | 8/2009 | Yamamura | F02B 63/04 290/2 |
| 2010/0038907 A1 | 2/2010 | Hunt et al. | |
| 2010/0320838 A1 * | 12/2010 | Massie | H02J 3/00 307/39 |
| 2013/0119948 A1 * | 5/2013 | Bekiarov | H02P 9/48 322/24 |
| 2014/0208751 A1 * | 7/2014 | Bowan | F01K 7/165 60/647 |
| 2014/0365022 A1 * | 12/2014 | Ghosh | G06Q 50/06 700/291 |
| 2014/0365024 A1 * | 12/2014 | Ghosh | G06Q 50/06 700/291 |
| 2015/0357952 A1 * | 12/2015 | Taylor | H02P 9/04 290/40 C |
| 2015/0377164 A1 * | 12/2015 | Kanno | F02D 29/02 290/40 R |
| 2016/0018878 A1 * | 1/2016 | Dustman | G06F 1/3287 710/315 |

* cited by examiner

REMOTE POWER SOLUTION

FIELD OF THE INVENTION

This invention relates generally to the field of electrical generation systems, and more particularly, but not by way of limitation, to electrical generation systems adapted for providing power to electric submersible pumping systems and associated auxiliary systems installed in locations without access to an established power grid.

BACKGROUND

Submersible pumping systems are often deployed in wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Prior art motors often include a fixed stator assembly that surrounds a rotor assembly. The rotor assembly rotates within the stator assembly in response to the sequential application of electric current through different portions of the stator assembly. The motor transfers power to the pump assembly through a common shaft keyed to the rotor. For certain applications, intermediate gearboxes can be used to increase the torque provided by the motor to the pump assembly.

Power is typically provided to the motor from a variable frequency drive (or variable speed drive) through an output (step up) transformer. The variable frequency drive is provided power from a local electrical power grid. The electric submersible pumping system typically includes a long power cable that extends from the surface facilities to the electrical motor positioned downhole.

Petroleum reserves are often located in isolated, rural locations. In certain areas, access to an established power grid is impossible or cost-prohibitive. There is, therefore, a need for a system that can reliably and efficiently provide electrical power to electric submersible pumps without access to an established power grid. It is to this and other deficiencies in the prior art that the present invention is directed.

SUMMARY OF THE INVENTION

In preferred embodiments, the present invention includes an independent power system configured to provide electrical power to an electric submersible pumping system positioned in a well that produces petroleum products. The independent power system includes a generator and a driver connected to the generator. The driver is preferably an engine that is provided with combustible gases from the petroleum products of the well. The independent power system further includes an integrated control system that is connected to the electric submersible pumping system and the generator. The independent power system is configured to balance the loads created by the electric submersible pumping system with the output from the electrical generator.

In another aspect, preferred embodiments include a process for providing electrical power from a generator to one or more electrical loads that are not connected to an established power grid. The process includes the steps of generating electrical power with a generator, monitoring the demand of the electrical loads, predicting a change in the demand of the electrical loads with an integrated control system; and adjusting the output of an electrical generator with the integrated control system to accommodate the demand of the electrical loads.

DETAILED DESCRIPTION OF THE PREFERRED EMBODIMENTS

Figure 1:
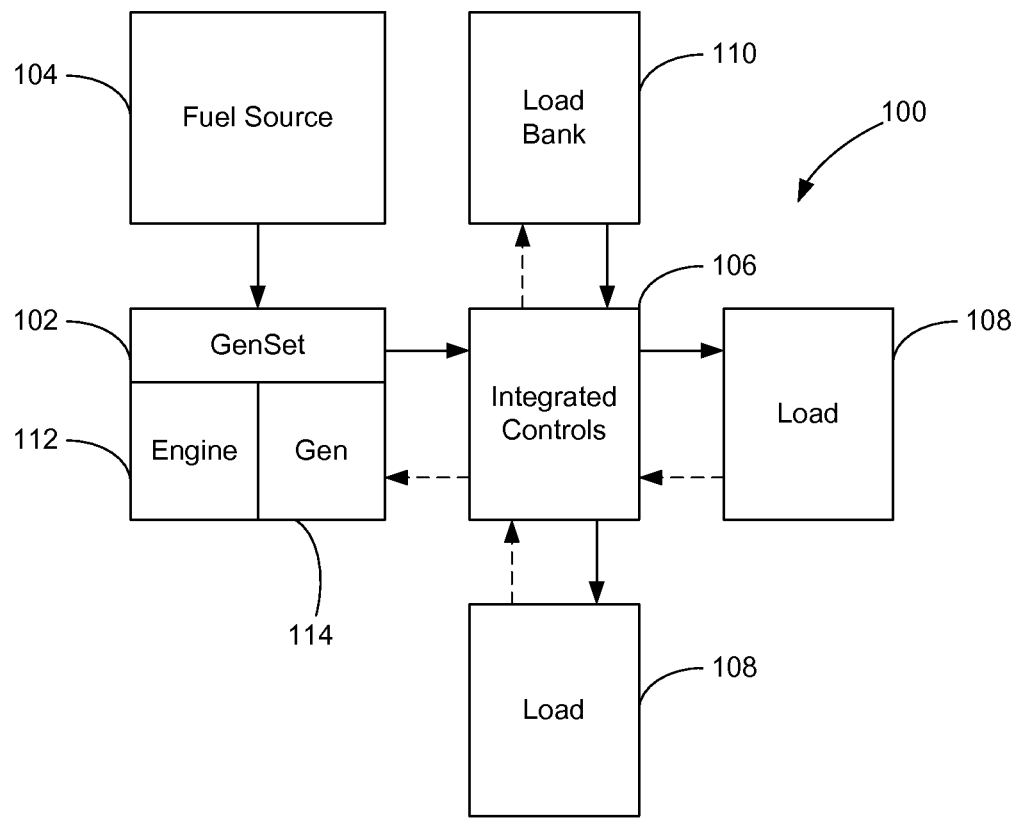
FIG. 1 is a diagrammatic depiction of a remote power supply system constructed in accordance with a presently preferred embodiment.

In accordance with a preferred embodiment of the present invention, FIG. 1 provides a general diagrammatic depiction of an independent power system 100. The independent power system 100 preferably includes at least one genset 102, a fuel source 104, an integrated control system 106 and one or more loads 108. The independent power system optionally includes a load bank 110.

The genset 102 includes a driver 112 coupled to a generator 114. As generally known in the art and in accordance with presently preferred embodiments, the driver 112 is an engine that converts chemical energy in the fuel from the fuel source 104 into mechanical energy. The generator 114 then converts the mechanical energy from the engine 112 into electrical energy. The loads 108 are general references for devices or systems that consume electrical power during a selected operation, such as, for example, electric motors, computers, motor controllers, lighting, heating and other electrical equipment. The loads 108 may specifically include surface pumps, water processing equipment, battery pumps, waste treatment equipment, lighting and transfer pumps.

The integrated control system 106 includes automated control devices that are configured to control the operation of the loads 108, monitor the operation of the loads 108, monitor the operation of the genset 102 and adjust the output of the genset 102. In a broad sense, the preferred embodiment of the independent power supply 100 depicted in FIG. 1 provides an automated method for detecting the operation of the loads 108, identifying a power requirement for each load 108, and manipulating the operation of the engine 112 and generator 114 to satisfy the power requirement for each load 108. In this way, the integrated control system 106 balances the power output from the genset 102 with the power demand from the one or more loads 108.

Unlike conventional installations in which loads are connected to a larger power grid, the small number of loads 108 within the independent power system 100 cause the power demand to be relatively volatile. For example, if one of the loads 108 consumes a significant portion of the total output from the genset 102, and the load 108 is suddenly turned off, the demand from the genset 102 must be rapidly reduced. The integrated control system 106 is configured to quickly detect or even predict the change in power demand so that the output of the genset 102 can be immediately balanced.

Demand from the loads 108 can be predicted by the integrated control system 106 based on scheduled operational changes, historic patterns of operation or from variation in operational characteristics. For example, if the load 108 is an electrical pump, the power demand for the electrical pump can be predicted based on the flowrate of the discharge from the pump. As the flowrate increases or decreases, the integrated control system 106 can be configured to predict an upcoming change in demand for the electric motor and adjust the output of the genset 102 accordingly.

In case of a sudden or unpredictable drop-off in power usage by the loads 108, the load bank 110 is activated to take-up the excess power and stop the engine 112 from racing. The load bank 110 can also be activated to maintain a minimum load to keep the engine 112 within its preferred operating parameters (for instance not running at too low a speed and hence too low a temperature). Inversely, if the demand of the loads 108 increases so the sum of the demand is higher than the normal output of the genset 102, the integrated control system 106 can be configured to overdrive for a period of time to satisfy the demand. Should an overdrive event occur, the integrated control system 106 can be configured to send a warning that the independent power system 100 is experiencing a generation shortfall.

Figure 2:
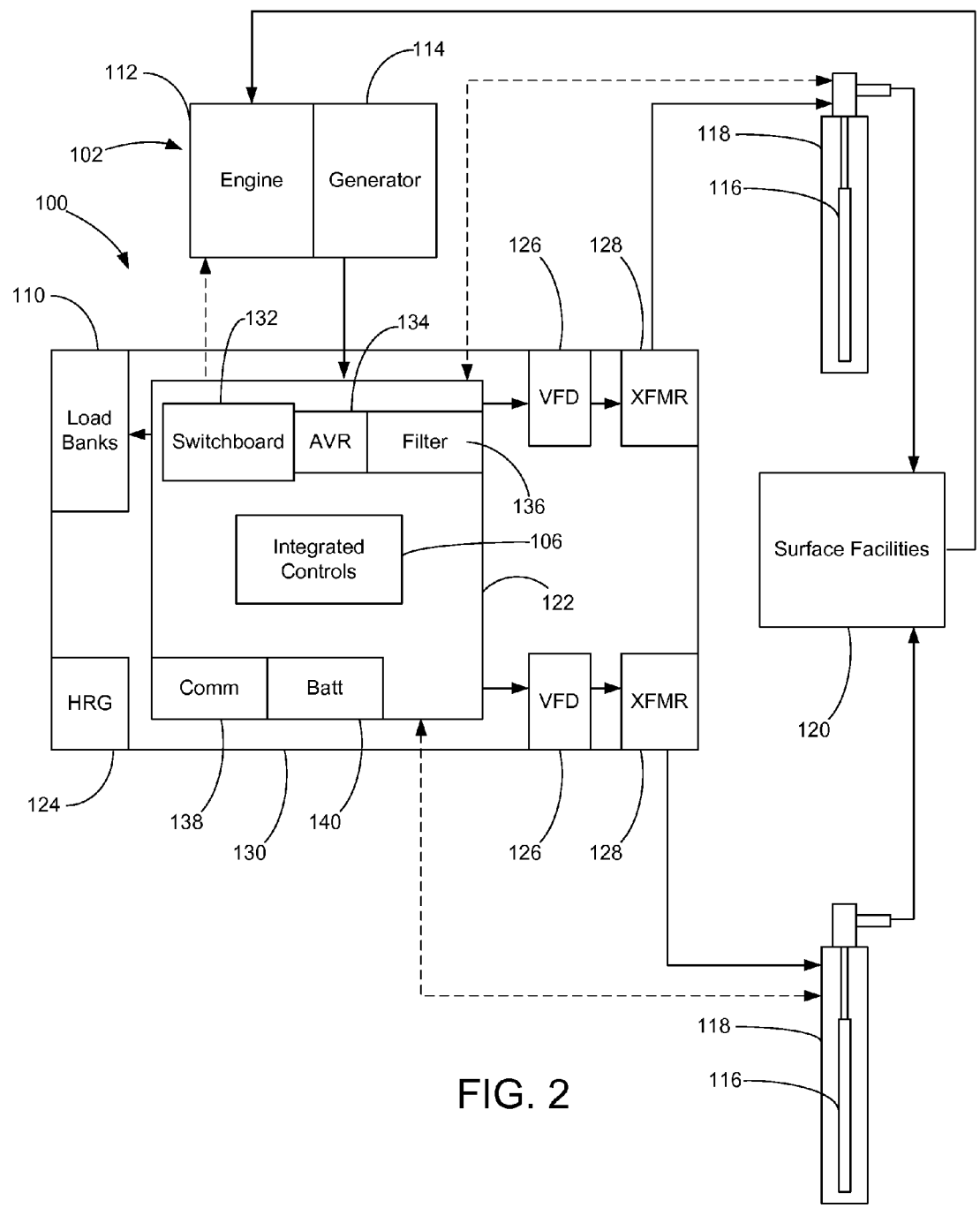
FIG. 2 is a diagrammatic depiction of a preferred embodiment of a remote power supply system connected to a pair of electric submersible pumping systems.

Turning to FIG. 2, shown therein is a diagrammatic representation of a preferred embodiment of the independent power system 100 used to provide power to electric submersible pumping systems 116 deployed in wells 118. Although the application of the independent power system 100 is not so limited, it will be appreciated the that independent power system 100 will find particular utility in providing power to electric submersible pumping systems disposed in wells drilled in remote locations for the production of petroleum products.

As will be understood by those skilled in the art, the electric submersible pumping system 116 typically includes a centrifugal pump that is driven by one or more electrical motors. Electricity is provided to the electrical motors through a power cable that extends from the surface to the motor disposed within the well 118. When energized, the electric submersible pumping system 116 pushes pumped fluids out of the well 118 to surface facilities 120. The surface facilities 120 may include, for example, phase separators, storage batteries and gathering lines used to separate, store and transfer the pumped petroleum products from the well 118. Although two electric submersible pumping system 116 are depicted in FIG. 2, it will be appreciated that fewer or greater numbers of electric submersible pumping systems 116 may be connected to a single independent power system 100. It will also be appreciated that, although the present disclosure includes the prescribed use of the electric submersible pumping systems 116, preferred embodiments of the independent power system 100 will include use in connection with surface-mounted electrical pumping systems.

The electric submersible pumping system 116 further includes a series of sensors that output signals representative of various operational characteristics, including, for example, flowrate, temperature, pressure, vibration and unintended leakage within the electric submersible pumping system 116. The operation and monitoring of downhole electric submersible pumping systems is more fully described in U.S. Pat. No. 8,347,953 issued Jan. 8, 2013, entitled "Inline Monitoring Package for Electrical submersible Pump," the disclosure of which is herein incorporated by reference.

In the embodiment depicted in FIG. 2, the independent power system 100 includes the genset 102, which in turn includes a driver coupled to a generator 114. The driver is preferably an engine 112 that is connected to the surface facilities 120 and draws a fuel source from the surface facilities 120. In a particularly preferred embodiment, the engine 112 is a reciprocating engine capable of operating solely on methane, ethane or other gases scavenged from the well 118. Suitable engines are offered by General Electric Company under the Waukesha brand. Notably, scavenging methane and ethane to power the engine 112 presents an environmentally responsible process for disposing of these gases. In the past, such gases have often been vented or flared at the well 118. Through use of emissions catalysts within the engine 112, the exhaust gases generated by combustion within the engine 112 present a significant environmental benefit over the disposal of unspent gases at the well 118. The performance of the emissions catalysts can be optimized by maintaining the engine 112 within its preferred operating parameters through use of the integrated control system 106 and the load banks 110.

In this way, the embodiment of the independent power system 100 depicted in FIG. 2 is capable of operating without connection to an existing power grid or to an externally-supplied fuel source. The ability to operate the independent power system 100 without reliance on the delivery of liquid fuels represents a significant benefit over the prior art. Although reciprocating engines are presently preferred, in an alternate embodiment, the engine 112 is a turbine engine. Suitable turbine engines are available from General Electric Company and can be configured to operate on a variety of fuels.

Continuing with FIG. 2, the independent power system 100 includes a central control module 122, load banks 110, a high-resistance ground 124, one or more variable frequency drives 126 (two are shown) and one or more step-up transformers 128 (two are shown). Each of these components is preferably positioned on a common platform or skid 130. The use of a skid 130 allows the independent power system 100 to be easily transported to remote locations without the use of cranes and reduces rig-up time. In a particularly preferred embodiment, the skid 130 is configured to be rolled on and off a conventional lowboy trailer.

The central control module 122 includes the integrated control system 106 and other components used to control, condition and direct power supplied by the genset 102. The central control module 122 is preferably configured as an enclosure that protects the internal components in an environmentally controlled structure. Heating, cooling and ventilation equipment (not shown) is all powered by the genset 102.

In a particularly preferred embodiment, the central control module 122 includes a switchboard 132, an automatic voltage regulator 134 and a filter 136. The switchboard 132 is used to direct power supplied by the genset toward a designated load, such as the electric submersible pumping systems 116 or the load banks 110. The automatic voltage regulator 134 and filter 136 are used to condition the power supplied by the genset 102 and to remove or diminish the voltage waveform distortions and harmonics within the independent power system 100. The filter 136 preferably includes a separate control system that provides data about harmonics detected in the independent power system 100. The filter 136 is preferably programmed to automatically self-activate to reduce or eliminate harmonics detected in the independent power system 100. The data from the filter 136 can also be provided to the integrated control system 106 so that other adjustments within the independent power system 100 can be made to alleviate the harmonics.

The central control module 122 provides the conditioned power to the variable frequency drives 126. The variable frequency drives 126 are used to adjust the frequency of the alternating current, which in turn adjusts the operational speed of the motor of the electric submersible pumping system 116. The step-up transformers 128 are used to increase the voltage of the electricity leaving the variable frequency drives 126 to account for voltage drop experienced during transmission to the electric submersible pumping system 116. Alternatively, the genset 102 can be configured to produce a higher voltage (such as 4160V instead of 480V). If the genset 102 is configured to produce a sufficiently high voltage, it may be possible to omit the step-up transformers from the independent power system 100.

In an alternate preferred embodiment, the independent power system 100 is connected to two or more variable frequency drives 126 such that harmonics and wave distortion are cancelled through destructive interference. To achieve cancellation of harmonics and wave distortions, two matched-sets of variable frequency drives 126 are connected to the genset 102 and operated 180 degrees out of phase. Any resulting harmonics and wave distortions created by the non-linear loads from the matched-sets of variable frequency drives 126 are cancelled or significantly offset. Thus, when connected to multiple variable frequency drives 126, it is preferred that the variable frequency drives 126 be configured and operated as symmetrical, non-linear loads that cooperatively cancel harmonics and wave distortions. The use of a harmonics-cancelling configuration may obviate the need for the filter 136 within the central control module 122.

The integrated control system 106 receives inputs representative of the operational characteristics of the electric submersible pumping systems 116. The integrated control system 106 also receives inputs from the genset 102 and other components within the independent power system 100. In response to these inputs, the integrated control system 106 is configured to balance the power produced by the genset 102 with the demands of the electric submersible pumping systems 116 and other loads within the independent power system 100. As the output from the genset 102 is adjusted to satisfy the demands of the submersible pumping systems 116, the integrated control system 106 also manipulates other components within the independent power system 100 to increase the power factor of the independent power system 100 and to optimize the performance of the electric submersible pumping systems 116. As noted above, in certain circumstances it will be desirable for the integrated control system 106 to activate the load banks 110. The load banks 110 can be used to buffer changes in the overall demand on the genset 102.

In a particularly preferred embodiment, the central control module 122 further includes a data communication system 138 and a back-up power supply 140. The data communication system 138 is configured to relay information about the operation of the independent power system 100 and the electric submersible pumping systems 116 to a remote monitoring location. The data communication system 138 may include satellite, radio, cellular, or other communications hardware. In the event the genset 102 fails to deliver power to the central control module 122, the back-up power supply 140 allows the data communication system 138 to continue to send information to the remote monitoring facility for a period of time. This allows the independent power system 100 to self-report service needs even without power from the genset 102.

Figure 3:
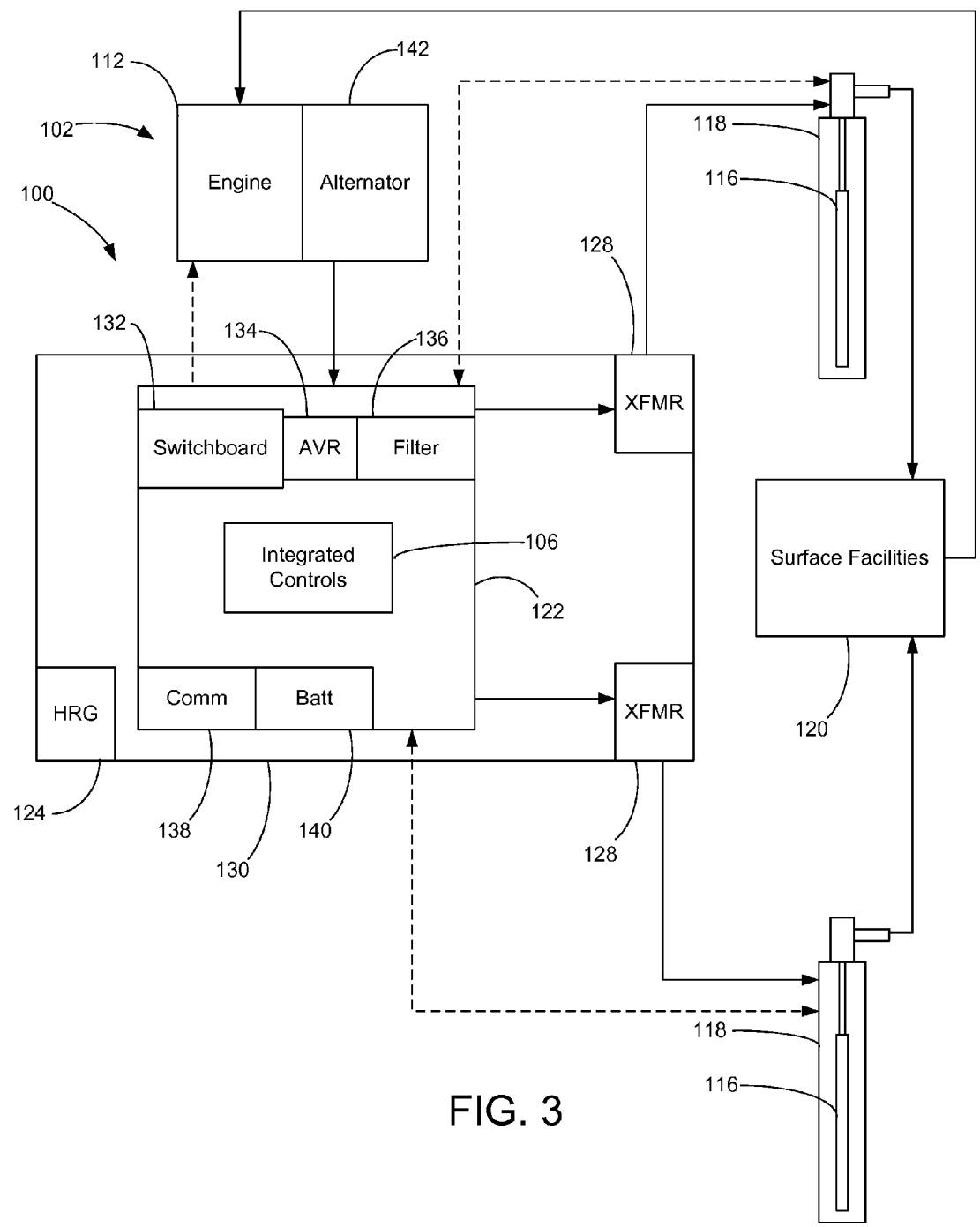
FIG. 3 is a diagrammatic depiction of an alternate preferred embodiment of a remote power supply system connected to a pair of electric submersible pumping systems.

Turning now to FIG. 3, shown therein is an alternate preferred embodiment of the independent power system 100. In the alternate embodiment depicted in FIG. 3, the variable frequency drives 126 have been removed and replaced with a variable frequency alternator 142. The variable frequency alternator 142 is configured to provide current at an output frequency that is dependent on the speed at which the engine 112 is operated. To increase the speed of the electric submersible pumping systems 116, the speed of the engine 112 is increased, which in turn increases the frequency of the current supplied by the alternator 142. The use of a variable frequency alternator 142 that is directly connected to the electric submersible pumping system 116 eliminates the need for expensive variable frequency drives 126. Furthermore, because the power supplied by the genset 102 is directly responsive to the demand of the electric submersible pumping systems 116, the load banks 110 can be removed from the independent power system 100. The genset 102 will not produce excess capacity because it is operated strictly in response to demands of the electric submersible pumping systems 116.

Under both embodiments depicted in FIGS. 2 and 3, the integrated control system 106 is preferably programmed to ensure that devices within the independent power system 100 and the electric submersible pumping systems 116 are started in an optimal order. The integrated control system 106 waits until one device in the start-up chain is operating correctly before starting the next device. The integrated control system 106 also ensures that pumps are started in sequence without putting too high a start-up load on the independent power system 100 and to minimize harmonics and reactive power issues. Customer-specific inputs can also be included within the integrated control system 106. For example, the integrated control system 106 can be programmed to activate electric submersible pumping systems 116 on a priority basis to ensure that certain higher priority pumps are operational before lower priority pumps are brought online.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A process for providing electrical power from a generator to one or more electrical loads that are not connected to an established power grid, the process comprising the steps of:
    generating electrical power with a generator;
    monitoring the demand of the electrical loads;
    adjusting the output of an electrical generator with the integrated control system to accommodate the demand of the electrical loads, and
    predicting a change in the demand of the electrical loads with an integrated control system.

2. The process of claim 1, wherein the one or more electrical loads are selected from the group consisting of submersible pumps, surface pumps, water processing equipment, battery pumps, waste treatment equipment, lighting, drilling equipment, auxiliary electrical equipment and transfer pumps.

3. The process of claim 2, wherein the one or more electrical loads is an electric submersible pumping system, and wherein the step of monitoring the demand of the electrical loads comprises monitoring in real-time the operational characteristics of the electric submersible pumping system.

4. The process of claim 3, further comprising the step of:
using a variable frequency drive to adjust the operational speed of the electric submersible pumping system.

5. The process of claim 3, further comprising the step of:
using a variable frequency alternator to adjust the operational speed of the electric submersible pumping system.

6. The process of claim 1, further comprising the steps of:
detecting a decrease in the demand of the one or more electrical loads; and
activating a load bank to draw power from the generator.

7. The process of claim 1, wherein the one or more electrical loads is two electric pumping systems, and wherein the step of monitoring the demand of the electrical loads comprises monitoring in real-time the operational characteristics of the two electric pumping systems.

8. The process of claim 7, further comprising the steps of:
providing a pair of matched variable frequency drives, wherein each of the pair of matched variable frequency drives is connected to a separate one of the two electric pumping systems; and
operating the pair of matched variable frequency drives to cancel harmonics generated by the non-linear loads produced by each of the variable frequency drives.

9. An independent power system comprising:
a generator that produces an electrical power output;
a driver connected to the generator;
an electrical load that places an electrical demand on the generator; and
an integrated control system connected to the electrical load and the generator; wherein the integrated control system is configured to predict a change in the demand of the electrical load and automatically balance the output from the generator with the demand of the electrical load.

10. The independent power system of claim 9, wherein the electrical load is selected from the group consisting of submersible pumping systems, surface pumping systems, water processing equipment, battery pumps, waste treatment equipment, lighting, drilling equipment, auxiliary electrical equipment and transfer pumps.

11. The independent power system of claim 10, wherein the electrical load is an electrical pumping system, and wherein the independent power system further comprises:
a variable frequency drive in electrical communication with the generator and the electrical pumping system; and
wherein the operational speed of the electrical pumping system is adjusted by controlling the variable frequency drive.

12. The independent power system of claim 10, wherein the generator comprises a variable frequency alternator and wherein the variable frequency alternator is configured to provide current at a selected frequency to the electrical pumping system.

13. The independent power system of claim 9 further comprising:
a data communication system configured to relay information about the operational characteristics of the independent power system and the electrical loads; and
a back-up power supply connected to the data communication system.

14. The independent power system of claim 9, wherein the driver is an engine that is selected form the group consisting of reciprocating engines and turbine engines.

15. The independent power system of claim 9, further comprising:
a load bank; and
wherein the integrated control system can activate the load bank to draw power from the generator to balance the output of the generator with the sum of the demand from the load bank and the demand from the electrical load.

\* \* \* \* \*